April 23, 1963 W. PFERD 3,087,018
TICKET OPERATED TELEPHONE SET
Filed Dec. 18, 1958 2 Sheets-Sheet 1
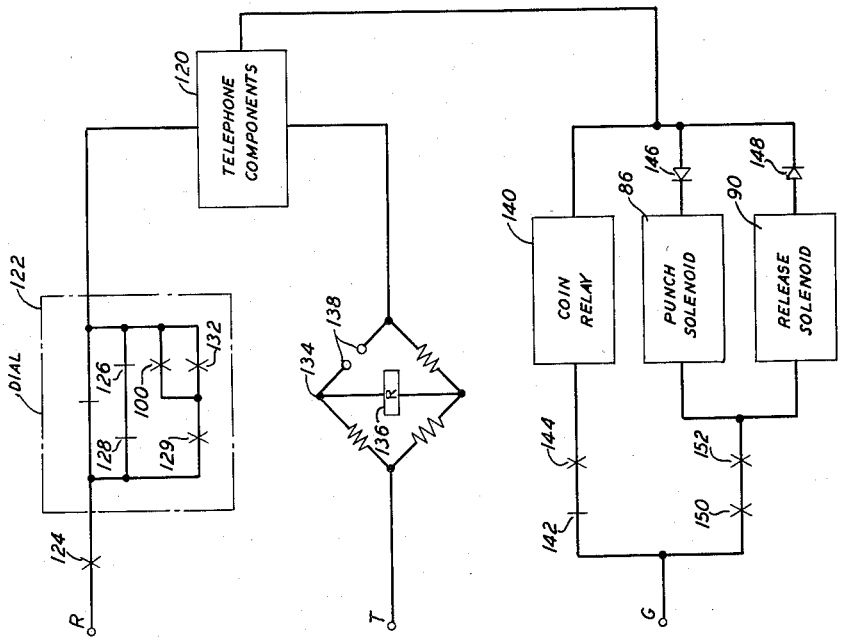
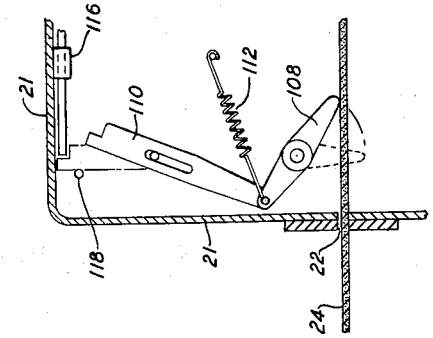
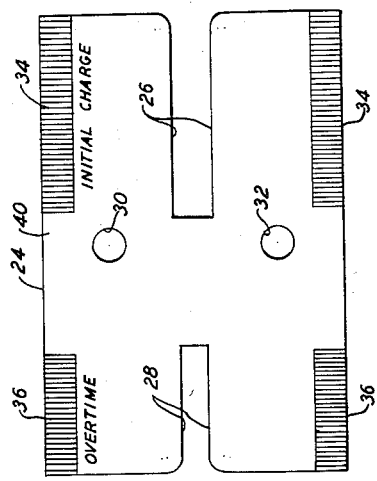
INVENTOR
W. PFERD
BY John C. Morris
ATTORNEY

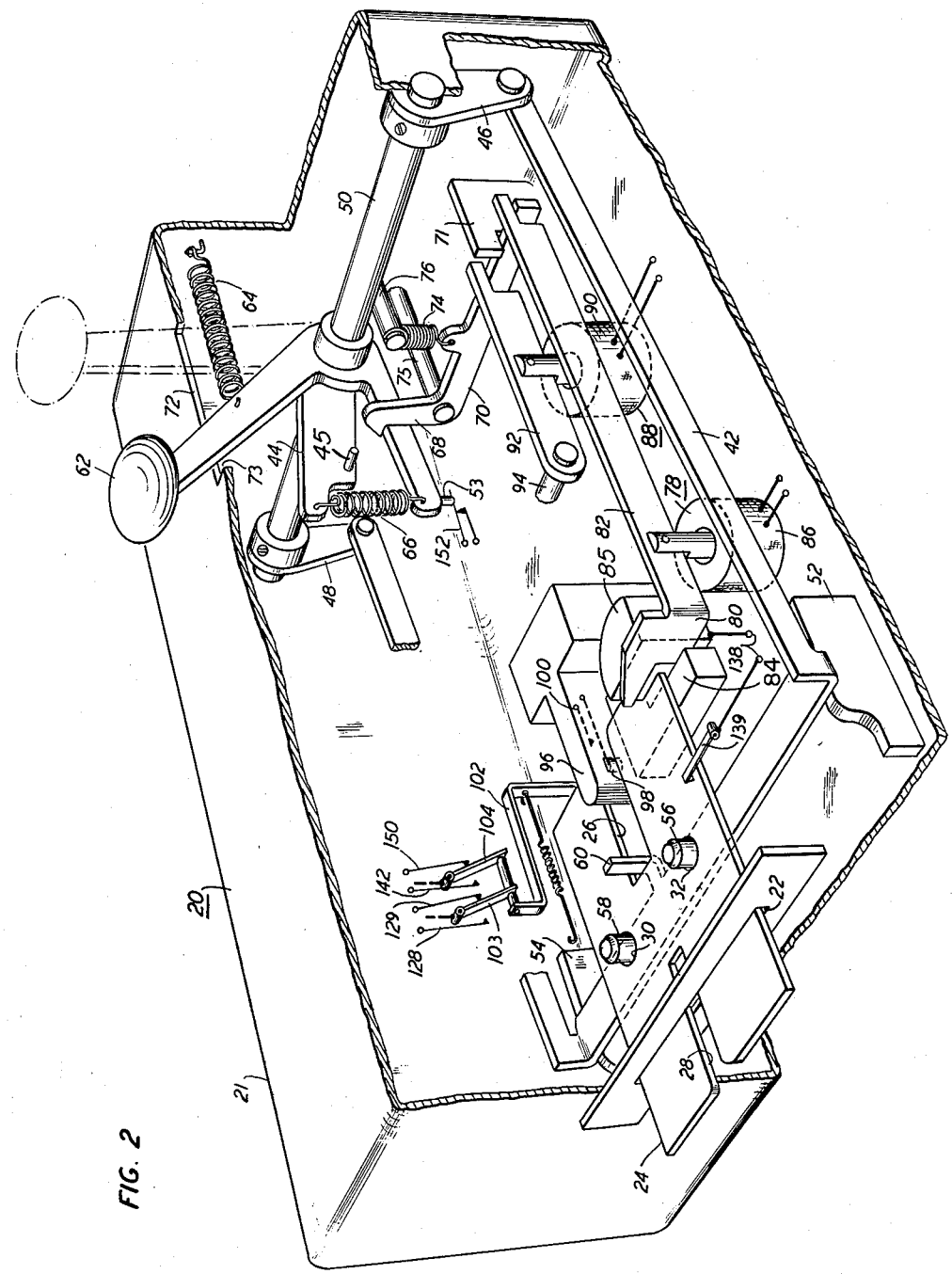

United States Patent Office 3,087,018
Patented Apr. 23, 1963

3,087,018
TICKET OPERATED TELEPHONE SET
William Pferd, Watchung, N.J., assignor to Bell Telephone Laboratories, Incorporated, New York, N.Y., a corporation of New York
Filed Dec. 18, 1958, Ser. No. 781,252
15 Claims. (Cl. 179—6.4)

This invention relates to communication systems and more particularly to public operated substation equipment.

Surveys conducted by telephone companies have found that in high usage paystations approximately 50 percent of the paystation's revenue is deposited by 15 percent of the paystation's customers. This relatively small group of customers, which are presumed to be business persons, such as salesmen, has a disproportional effect on the collection and accounting of paystation revenue by telephone companies. Moreover, these customers are required to obtain and deposit as much as one to two dollars in coin which for a business person is inconvenient and time consuming. In the interest of service to such customers and operating economies to telephone companies, it is desirable, therefore, to obtain a method of paystation operation that allows bulk payment to be made at a telephone company's business office for a selected number of paystation calls and overtime charges.

A general object of the invention is improved public telephone operation to customers and telephone companies.

One object of the invention is to supply public telephone service without the requirement of depositing coins.

Another object of the invention is a ticket-operated public telephone set.

A specific object of the invention is a ticket for a limited number of local and overtime calls and apparatus responsive to the ticket for operation of a public telephone.

According to one feature of the present invention a coin-operated substation included in a telephone system is enabled without the deposit of a coin by a ticket-actuated device on the insertion of a ticket into the device, the ticket being punched and released on the completion of a call and on the failure to complete the call the ticket being released without punching.

A feature of the present invention is electrical apparatus for identifying proper tickets for operating a ticket-actuated device.

According to another feature of the present invention a ticket purchased from a telephone company includes coding for a limited number of initial substation calls and for overtime charges. When the initial call coding portion of the ticket is inserted into a ticket-actuated device a substation is enabled for dialing and calling purposes. When the overtime charge coding portion of the ticket is inserted into the device the substation is enabled for calling but without dialing capabilities.

Another feature of the present invention is an electrically operated punch and release mechanism included in a ticket-actuated telephone set, the mechanism punching a ticket inserted into the set after completion of a call and on failure to complete the call the ticket being released without punching.

In an illustrative embodiment, the present invention comprises in combination a coin-operated substation and a ticket-actuated device which, when operated, enables the substation for calling purposes. The ticket-actuated device is contained within a housing having an opening at one end for the insertion of a ticket purchased from a telephone company for a limited number of initial calls and overtime charges. Included in the ticket-actuated device are a plurality of contacts operable when engaged by the ticket, carriage means for transporting the ticket into an electrically operated punch and release device, the carriage means being operated either automatically or by lever means, and an electrically operated releasing mechanism. Inserting the ticket into the opening of the housing and operating the lever causes the contacts to function to enable the substation for calling purposes. The ticket is punched and released on completion of a call and on the failure to complete the call the ticket is returned without punching. For overtime charges, the ticket is withdrawn on release and the opposite end thereof inserted into the opening of the substation which is enabled without dialing apparatus.

These and other objects and features of the present invention will be more fully apprehended from the following detailed specification taken in conjunction with the appended drawing in which:

FIG. 1 is a plan view of a ticket representative of that which may be employed in the present invention;

FIG. 2 is a perspective view with parts broken away of one embodiment of a ticket-actuated device employed in the present invention;

FIG. 3 is a schematic of a locking linkage which is included in the ticket-actuated device of FIG. 2; and FIG. 4 is a schematic electrical circuit diagram included in the device of FIG. 2.

Referring to FIGS. 1 and 2, the apparatus of the present invention comprises a ticket-actuated device 20 including a housing 21 having an opening 22 therein for receiving a ticket 24. The device may take one of several forms. In one case it may be attached to a standard public telephone substation or it may be enlarged to include the substation apparatus. For purposes of the present application, the device is represented as one that could be suitably attached to a public substation.

The ticket 24 of FIG. 1 is made of some easily punchable material and preferably of identification card size which facilitates the carrying thereof by a customer. The ticket includes guide slots 26 and 28 of different widths for reasons to be explained hereinafter and locking holes 30 and 32. Along the longitudinal sides of the cards are markings 34 and 36, the former for initial or local calls and the latter for overtime charges.

The number of markings represents the value of the ticket which has been arbitrarily chosen as ten dollars for 72 ten cent initial calls and 48 five cent overtime charges. The ticket, ordinarily would be sold to customers at the business office of a telephone company. The guide slots 26 and 28 are of different widths for preventing the overtime or five cent end of the card from being presented for payment of initial or ten cent calls.

Although the ticket has been shown with the markings along the longitudinal edges thereof, it is also apparent that they could be placed in other locations, for example, along the edges of the guide slots. The present locations of the marking have been selected solely for reasons of convenience.

Along the markings 4 and 36 and for a selected distance beyond the last marking of each group, the composition of the ticket includes a controlled resistance which identifies a proper ticket for use in the device 20 as will be explained in more detail hereinafter. The guide slots, locking holes, and ticket width form a coding arrangement for the ticket which also identifies proper tickets for use in the device of FIG. 2.

In FIG. 2 the housing 21 of the ticket-actuated device 20 includes a shaft 50 which is journaled in opposite side walls thereof. A pair of link members 46 and 48 are attached to the shaft and connect to a carriage 42 having locking pins 56 and 58 and a stop member 60 secured thereto for engaging the ticket. The shaft and the links are adapted to supply longitudinal motion to the carriage which travels on cam plates 52 and 54, the carriage having vertical movement near the opening 22 as a result of the shape of the cams.

A lever 62 of L-shaped configuration is journaled on the shaft 50 and normally biased to an upright position by a helical spring 64. The base portion of the lever is connected to a drive plate 44 through a spring 66. The drive plate is attached to the shaft and a pin 45 mounted to and extending laterally from the drive plate underlies the base portion of the lever. The movement of the lever is limited by a slot 72 in which the lever travels. The limited rotational movement of the lever is applied through the drive plate 44, shaft 50, and the links 46 and 48 to the carriage 42 as essentially longitudinal movement. The lever, when urged to an end 73, designated the inner end of the slot, is held by a pawl 68 which engages the base portion thereof. The pawl includes an arm portion 70 and rotates on a pin 75. Viewed from the opening of the housing the pawl is biased in the counterclockwise direction of rotation against a stop 71 by a spring 74 which is attached to the arm 70 and a rod 76 secured to the wall of the housing.

A ticket punch and release device 78 included in the housing comprises a punch 80 and a die 84, the die including a stop portion 85 electrically insulated therefrom. With a ticket in position as shown in FIG. 2, a portion of the leading edge of the ticket is urged against the stop portion 85 by the carriage 42, and it is this leading edge portion that is removed from the ticket by each operation of the punch 80. Thus with each use of the ticket a fresh edge is presented to the stop portion 95, and the carriage 42 moves the ticket further into the housing 21. The punch is operated by a punch release solenoid 86, an arm 82 of the punch being secured to the plunger of the solenoid. The arm 82 overhangs and contacts the arm 70 of the pawl 68. The arm 82 rotates the pawl 68 in the clockwise direction or away from the lever 62 when operation of the punch release solenoid occurs.

A ticket release device 88 also rotates the pawl 68 in the clockwise direction when operation thereof occurs. The release device 88 comprises a releasing solenoid 90 and a lever 92 pinned to the solenoid plunger and pivoting on a pin 94. The lever 92 overhangs the arm 70 of the pawl in a manner substantially identical to that of the arm 82.

A guide post 96 stationed in front of the opening 22 directs the ticket 24 into the punch and release device 78. The post includes on each side thereof a spring loaded button 98 only one of which is shown. The buttons when depressed close a set of overtime contacts 100 contained within the guide post. Also stationed adjacent to the opening is a spring loaded bracket member 102 which is connected to a pair of levers 103 and 104 pivoted on the side wall of the housing. The levers cooperate with a plurality of contacts to be described in connection with the electrical circuit of the ticket-actuated device. The bracket when engaged by the ticket causes the contact positions to be shifted in accordance with a predetermined arrangement.

The lever 62 when in the normal or upright position is held by a locking mechanism shown in FIG. 3. The mechanism comprises a spring loaded toggle assembly which includes pivoted links 108 and 110. A spring 112 normally biases these links in an upright position. A rod 114 is connected to the lever 62 and rests on the end of the pivoted link 110 which abuts a fixed pin 118 in the upright position. The rod travels in a guide 116 which is attached to the housing 21.

The lever locking mechanism is suitably fastened within the housing so as to be adjacent to the opening 22. When the ticket 24 is inserted into the opening, the toggle assembly is removed from contact with the rod 114 which permits the lever 62 to be operated. On withdrawal of the card from the opening, the lever is returned to the upright position by the action of spring 64 and the toggle assembly snaps into position between the pin 118 and the ends of the rod 114 thereby preventing further movement of the lever.

The electrical circuit associated with the ticket-actuated device 20 is shown in FIG. 4, lines R, T, and G therein being the ring, tip, and ground lines, respectively, from a central office exchange (not shown) to a substation (not shown) including telephone components 120. The ring line is connected to a dialing mechanism 122 of the substation through a hookswitch 124 of the substation handset, the switch being normally open until closed when the handset is removed from the hook. For purposes of description only, contacts in the normally open position will be shown by an "X" and in the normally closed position will be shown by a single vertical line. As is well known, the dialing mechanism of a substation is normally shortcircuited by a hopper trigger circuit which includes hopper trigger contacts 126 that open on the insertion of a coin into the substation. The hopper trigger circuit of the present invention is modified to include ticket-operated contacts 128 operable when engaged by the ticket 24. In addition to the hopper trigger circuit the dialing mechanism of the present invention is also short-circuited by a fraud prevention circuit which includes ticket-operated contacts 129 in series with relay-operated contact 132. It will be seen that when both of these contacts are closed the dial mechanism is disabled by a shortcircuit. The over-time contacts 100, described in conjunction with FIG. 2, are in parallel with the contacts 132.

The tip line includes a bridge circuit 134 with a relay 136 connected across the midpoints thereof. The relay operates the contacts 132 when the bridge is unbalanced. One arm of the bridge includes contacts 138 which engage the controlled resistance portion of the ticket. A proper resistance in the ticket balances the bridge whereas an improper resistance unbalances the bridge and causes the relay 136 to operate and close the contacts 132.

The ground line is connected to a coin relay 140 of the substation through ticket-operated contacts 142 in series with contacts 144 which close on the insertion of a coin into the substation. The coin relay is disconnected from the ground line when the contacts 142 are operated by the ticket. Connected across the coin relay are the punch release and release solenoids 86 and 90, respectively (see FIG. 2), these solenoids being connected in parallel and associated with diodes 146 and 148, respectively, for directing currents of opposite polarities to the solenoids. The solenoidal circuits also include ticket-operated contacts 150 and lever-operated contacts 152 which are in series and connected between the ground line and the solenoids.

Returning now to FIG. 2, the ticket-operated contacts 128, 129, 142, and 150, the bridge contacts 138, and the lever contacts 152 appear in their mechanical form under the same numbers as indicated in FIG. 4. The relay contacts 132 and relay 136, however, are not shown for purposes of simplifying the drawing. The ticket-operated contacts 128 and 129 employ the lever 103 for opening and closing action, respectively, whereas the ticket-operated contacts 142 and 150 employ the lever 104 for this same action. The levers 103 and 104 are shown in their operated positions and they return to their normal positions engaging contacts 128 and 142, respectively, when the ticket is removed from the opening which returns the bracket 102 attached to the levers to a position adjacent to the opening. The flexibility and spacing of the contacts 128, 129, 142, and 150 are selected to follow the full travel of the ticket without interfering with each other. The bridge contacts 138 comprise a brush element 139 and the stop portion 85 of the die 84 of the punch and release device 78. With a ticket in position as shown in FIG. 2, the brush element 139 contacts a surface of the ticket and the stop portion 85 contacts an edge of the ticket, the portion of the ticket therebetween providing a conductive path that closes the contacts 138. The lever contacts 152 are normally open and close when an insulating pin 53 attached to the lever 62 engages the contact when the lever 62 is moved to the locked position shown in FIG. 2.

The electrical and mechanical structure having been described, the remaining paragraphs will be devoted to the operation of the present invention which begins with a customer inserting the ticket 24 into the opening 22 of the housing for an initial or local call. To do this, the end of the ticket having the wide slot is inserted into the opening. Inserting the other end of the ticket for an initial call will short out the dialing mechanism as will be explained hereinafter. The ticket acts against the lever locking mechanism to release the lever for operation by the customer. Simultaneously, the customer lifts the handset of the substation and urges the lever 62 toward the end 73 of the slot 72. The lever is locked in the forward position by the pawl 68 engaging the base portion thereof and the contacts 152 are closed by the pressure of the pin 53 against them. As the lever rotates, the spring 66 pulls the drive plate 44, the shaft 50 and the links 46 and 48 in the same direction, the carriage 42 attached to the links moving away from the opening and being guided by the cams 52 and 54. The initial movement of the carriage is inward and upward to cause the locking pins 56 and 58 to engage the locking holes 30 and 32 of the ticket which is carried into the housing. The movement of the carriage terminates on engagement of the ticket and the die 84, the ticket being held firmly in contact with the die by the pressure of the spring 66 on the drive plate, shaft, and carriage means.

In the final position of the ticket, the contacts 128 and 142 are opened and the contacts 129, 150, and 152 are closed. It will be seen in FIG. 4 that the open contacts 128 prevent the normally closed hopper trigger contacts 126 from short circuiting the dialing mechanism 122 while the open contacts 142 disconnect the coin relay 140 from the ground line. The closed contact 129 completes the path to the relay operated contacts 132 and the overtime contacts 100, thereby placing them in a position to short circuit the dialing mechanism 122. The closed contacts 10 and 12 connect the solenoids 86 and 90 to the ground line. The bridge contacts 138 engage the ticket and place the controlled resistance portion thereof in the bridge circuit 134. A proper resistance balances the bridge which prevents operation of the relay 136. As a consequence, the relay-operated contacts 132 remain open and the dialing mechanism 122 is enabled. When a ticket has improper controlled resistance therein an unbalance occurs in the bridge which operates the relay 136 to close the contacts 132 and complete the fraud prevention circuit, the dialing mechanism thereby becoming disabled. The overtime contacts 100 in parallel with the relay-operated contacts 132 are also open since the buttons 98 (see FIG. 2) which operate the contacts 100 are not engaged by an edge of the slot 26 at the initial end of the ticket, the slot width being selected to be greater than that of the guide post 96 and the protruding buttons therein. With contacts 100, 128, and 142 open and contacts 150, 152 and 138 closed (the proper controlled resistance connected between the latter contacts), it will be seen from FIG. 4 that the ring, tip, and ground lines are connected to the components 120 of the substation for operation thereof.

Upon the running of the time period for a call or the termination of a call by the hanging up of the handset of the substation, the coin collect pulse of the central office operates the punch release solenoid 86 which simultaneously punches the ticket and rotates the pawl 68 away from the lever. The spring 64 returns the lever to the upright position and the lever locking mechanism functions, as previously described, to maintain the lever in the upright position. As the lever 62 moves to the upright position, the base portion thereof engages the pin 45 mounted to the drive plate 44, rotating the drive plate and thereby the shaft 50 in a clockwise direction as viewed in FIG. 2. The links 46 and 48 move the carriage 42 towards the opening 22, the locking pins 56 and 58 being withdrawn from the ticket when the carriage reaches the outer ends of the cams 52 and 54. The customer may thereupon withdraw the ticket which has been punched for the completed call.

In the event that the customer desires to continue talking after the ticket is released due to the running of the time period for the call, there is a half minute interval between the central office collect pulse and circuit test to reinsert the opposite end of the card into the device for overtime payment. On insertion of the overtime end of the card into the device 20 and depressing the lever 62, the buttons 98 close contacts 100 due to the width of the slot 28 in the ticket being selected to be the same as that of the guide post 96 in which the buttons are located. Since the contacts 129 are closed by the ticket, the closed contacts 100 complete a shortcircuit across the dial 122 which disables the substation for dialing purposes. The substation, however, may still be employed for talking purposes. Again, the controlled resistance of the overtime end of the card is inspected by the bridge circuit 134 to disable operation of the substation in the event that an improper ticket is inserted into the device 20. On completion of the overtime period or hang up of the substation handset by the customer, the card is punched and released by the collect pulse of the central office. If desired, the customer can continue talking for additional overtime periods after depressing the lever 62. Each overtime period, of course, is punched out of the card as has previously been described.

If the customer should hang up the handset before a connection is made with the called party, as when the customer makes a mistake in dialing or gets a busy signal, the refund pulse of the central office operates the ticket release device 88. The refund pulse energizes the releasing solenoid 90 and the plunger of the solenoid moves the lever 92 attached thereto into engagement with the arm 70 of the pawl 68. The lever 92 rotates the pawl 68 away from the lever 62, permitting the spring 64 to return the lever 62 to an upright position. As described above, this movement of the lever 62 results in the carriage being moved towards the opening 22 and the locking pins 56 and 58 being withdrawn from the ticket 24, allowing the ticket to be removed from the opening 22.

In connection with the ticket, the controlled resistance thereof inserted in the bridge circuit 134 does not change in magnitude until the removal of the last punching in the markings 34 or 36. It will be seen in FIG. 2 that the contacts 138 are a fixed distance apart and they always engage the same length of the controlled resistance in the ticket which is held against the stop portion 85 of the die 84 by the pressure of the spring 66 acting on the carriage means 42. When the last marking of a section has been removed, however, the ticket is denied further entry into the housing by the end of the ticket abutting the cross piece of the guide post 96. Thus a portion of the leading edge of the ticket is no longer in engagement with the stop portion 85 of the die 84 and the conductive path between the contacts 138 is broken. The bridge circuit 134 is consequently unbalanced, causing the relay 136 to close the contacts 132 of the fraud prevention circuit and thereby shortcircuit the dialing mechanism 122. Hence a ticket having the markings all punched cannot be employed to enable a substation since the fraud prevention circuit is activated to disable the substation.

Although the device 20 has been shown manually operated, it may be readily modified for automatic operation wherein the customer inserts the ticket into the opening 22 and a mechanism included in the device functions to pull the ticket into the die 84 to enable operation of the substation. The principle of this mechanism would be similar to that employed in automatic time clocks. It is believed, therefore, that applicant should not be limited solely to a manually operated device and that other modifications of the present invention may be made by those skilled in the art without departing from the spirit and scope of the present invention.

What is claimed is:

1. In a telephone system including substations operated by monetary means, the combination of means responsive to a ticket for enabling a substation for calling purposes, means for holding the ticket during a call, means for punching and releasing the ticket after completion of the call, and means for releasing the ticket without punching on failure to complete the call.

2. In a telephone system including substations operated by monetary means, the combination of means responsive to a ticket for enabling a substation for calling purposes, means for preventing operation of said substation on presentation of an improper ticket, means for holding the ticket during a call, means for punching and releasing the ticket after completion of the call, and means for releasing the ticket on failure to complete the call.

3. In a telephone set, means responsive to a ticket for enabling the telephone set for calling purposes, means for preventing operation of the telephone set on presentation of an improper ticket, said operation preventing means detecting an electrical property of the ticket to discriminate between a proper and improper ticket, means for holding the ticket during the call, means for punching and releasing the ticket after completion of the call, and means for releasing the ticket on failure to complete the call.

4. In a telephone system including substations, the system providing a first signal on either the termination of a call or the running of the time limit on a call and a second signal on the non-completion of a call, the combination therewith of at least one of the substations having means for receiving a ticket, means responsive to the presence of a ticket in the receiving means for enabling the substation for calling purposes, means responsive to the first signal for punching and releasing the ticket, and means responsive to the second signal for releasing the ticket without punching.

5. In a telephone set, means for receiving a ticket, means for actuating the receiving means to secure the ticket thereto, means responsive to the presence of the ticket in the receiving means for enabling the telephone set for calling purposes, means responsive to the termination of a call for punching the ticket and actuating the receiving means to release the ticket, and means responsive to the non-completion of a call for actuating the receiving means to release the ticket.

6. In a telephone set operated in conjunction with a central office, means for receiving a ticket, means responsive to the presence of a proper ticket in the receiving means for enabling the telephone set for calling purposes, the enabling means including means for detecting an electrical property of a ticket present in the receiving means to discriminate between a proper and improper ticket, and means responsive to a signal from the central office for punching a proper ticket.

7. In a telephone set operated in conjunction with a central office, means for receiving a ticket, means responsive to the presence of a proper ticket in the receiving means for enabling the telephone set for calling purposes, the enabling means including means for detecting the resistance across a selected portion of a ticket present in the receiving means to discriminate between a proper and an improper ticket, and means responsive to a signal from the central office for punching a proper ticket.

8. In a telephone set having a dialing mechanism for transmitting signals to a central office, means for receiving a ticket, contacts responsive to the presence of a ticket in the receiving means for connecting the telephone set to the central office, means responsive to the presence of an improper ticket in the receiving means for disabling the dialing mechanism, the disabling means including contacts in parallel with the dialing mechanism for providing a short circuit thereacross, and means responsive to a signal from the central office for punching a proper ticket.

9. In a telephone set having a dialing mechanism for transmitting signals to a central office, means for receiving a ticket, contacts responsive to the presence of a ticket in the receiving means for connecting the telephone set to the central office, and means responsive to the presence of improper ticket in the receiving means for disabling the dialing mechanism, the disabling means comprising means for detecting an electrical property of the ticket and contacts actuated by the detecting means, the contacts being in parallel with the dialing mechanism and the detecting means upon failure to detect a desired electrical property in the ticket closing the contacts and thereby short circuiting the dialing mechanism, and means responsive to a signal from the central office for punching a proper ticket.

10. In a telephone set having a dialing mechanism, means for receiving a ticket, means for actuating the receiving means to secure the ticket thereto, contacts responsive to the presence of a ticket in the secured condition for connecting the telephone set to a telephone line, means responsive to the presence of an improper ticket in the secured condition for disabling the dialing mechanism, the disabling means comprising means for detecting an electrical property of the ticket and contacts actuated by the detecting means, the contacts being in parallel with the dialing mechanism and the detecting means upon failure to detect a desired electrical property in the ticket closing the contacts and thereby short circuiting the dialing mechanism, means responsive to the termination of a call for punching the ticket and actuating the receiving means to release the ticket, and means responsive to the non-completion of a call for actuating the receiving means to release the ticket.

11. A telephone set as set forth in claim 10 wherein the detecting means comprises an electrical bridge circuit having first and second series connected resistances connected in parallel with third and fourth series connected resistances, one of which resistances includes the resistance across a preselected portion of the ticket, the bridge circuit further including a relay for closing the contacts in parallel with the dialing mechanism, the relay having a winding one end of which is connected to the juncture of the first and second resistances and the other end of which is connected to the juncture of the third and fourth resistances, whereby when a ticket having other than a particular resistance is in the enabling position, the relay is energized, the contact closed, and the dialing mechanism short circuited.

12. In a telephone system including substations, the system providing a first signal on either the termination of a call or the running of the time limit on a call and a second signal on the non-completion of a call, the combination therewith of at least one substation including means for receiving a ticket, means for actuating the receiving means to secure the ticket thereto and to place the ticket in an enabling position, contacts responsive to the presence of a ticket in the enabling position for connecting the telephone set to a telephone line, means responsive to the presence of an improper ticket in the enabling position for disabling the dialing mechanism, the disabling means including means for detecting an electrical property of the ticket to discriminate between a proper and an improper ticket, means responsive to the first signal for punching and releasing a ticket from the enabling position, and means responsive to the second signal for releasing a ticket from the enabling position without punching.

13. In a pay station including a dial and first coin actuated contacts in parallel with the dial, the first coin actuated contacts being normally closed to short circuit the dial but being operated to an open position by the insertion of a coin in the pay station, and second coin actuated contacts for connecting the pay station to a telephone line, the second coin actuated contacts being normally open but being closed by the insertion of a coin in the pay station, the combination therewith of ticket receiving means, first ticket actuated contacts in series with the first coin actuated contacts, the first ticket actuated contacts being normally closed but being opened by the presence of a ticket in the ticket receiving means to nullify the first coin contacts, second ticket actuated contacts in series with the second coin actuated contacts, the second ticket actuated contacts being normally closed but being opened by the presence of a ticket in the ticket receiving means to nullify the second coin actuated contacts, and third ticket actuated contacts for connecting the pay station to a telephone line, the third ticket actuated contacts being in parallel with both the second coin actuated contacts and the second ticket actuated contacts, the third ticket actuated contacts further being normally opened but being closed by the presence of a ticket in the ticket receiving means.

14. A pay station as in claim 13 further including means responsive to the presence of an improper ticket in the receiving means for disabling the dialing mechanism, the disabling means comprising means for detecting an electrical property of a ticket positioned in the ticket receiving means and contacts actuated by the detecting means, the contacts being in parallel with the dialing mechanism, and the detection means upon failure to detect a particular electrical property in the ticket closing the contacts to short circuit the dialing mechanism.

15. A pay station as in claim 13 further including electrically operated punching means in series with the third ticket actuated contacts, the punching means punching a ticket positioned in the ticket receiving means upon the completion of a telephone call.

References Cited in the file of this patent
UNITED STATES PATENTS

| | | |
|---|---|---|
| 504,011 | Wratitsch et al. | Aug. 29, 1839 |
| 1,362,464 | Baum et al. | Dec. 14, 1920 |
| 1,705,859 | Gilbert | Mar. 19, 1929 |
| 1,910,963 | Polsen | May 23, 1933 |
| 2,450,997 | Shann | Oct. 12, 1948 |
| 2,674,655 | Gallagher | Apr. 6, 1954 |
| 2,783,865 | Cleave | Mar. 5, 1957 |
| 2,792,148 | Goldenberg | May 14, 1957 |